United States Patent [19]
Evans
[11] Patent Number: 4,893,126
[45] Date of Patent: Jan. 9, 1990

[54] INTEGRATED MILLIMETER-WAVE TRANSCEIVER

[75] Inventor: David H. Evans, Crawley, England
[73] Assignee: U.S. Philips Corporation, New York, N.Y.

[21] Appl. No.: 247,138
[22] Filed: Sep. 21, 1988
[30] Foreign Application Priority Data
Sep. 23, 1987 [GB] United Kingdom ................. 8722412
[51] Int. Cl.$^4$ ................................................ G01S 7/42
[52] U.S. Cl. .............................. 342/175; 343/700 MS
[58] Field of Search ........................ 342/175, 188, 361; 343/700 MS; 333/116; 455/86

[56] References Cited

U.S. PATENT DOCUMENTS

| | | | |
|---|---|---|---|
| 3,665,480 | 5/1972 | Fassett | 343/700 MS |
| 3,955,194 | 5/1976 | Chua | 342/700 MS |
| 4,063,246 | 12/1977 | Greiser | 343/700 MX |
| 4,251,817 | 2/1981 | Kimura et al. | 342/700 MS |
| 4,259,743 | 3/1981 | Kaneko et al. | 342/700 MS |
| 4,464,663 | 8/1984 | Lalezari et al. | 343/700 MS |
| 4,728,960 | 3/1988 | Lo | 343/700 MS |
| 4,737,793 | 4/1988 | Munson et al. | 342/700 MS |
| 4,742,354 | 5/1988 | Wen et al. | 343/700 MS X |

FOREIGN PATENT DOCUMENTS 257544 3/1988 European Pat. Off. .

*Primary Examiner*—Thomas H. Tarcza
*Assistant Examiner*—Mark Hellner
*Attorney, Agent, or Firm*—Robert J. Kraus

[57] ABSTRACT

An integrated millimeter-wave transceiver comprising a substrate on which is provided an annular slot antenna (D) and a balanced mixer (F). Transmitter power is applied to one point of the antenna and the balanced mixer (F) is coupled to a second point of the antenna, the second point being orthogonal to the one point in the plane of the antenna. The coupling of the balanced mixer to the second point is by way of a coplanar waveguide (C). A short circuit (H) in the coplanar waveguide (G) at a quarter wavelength from the mixer prevents an even (asymmetric) mode on the coplanar waveguide from being propagated to the antenna. An IF signal is derived using an RF band stop filter (I).

7 Claims, 1 Drawing Sheet

INTEGRATED MILLIMETER-WAVE TRANSCEIVER

BACKGROUND OF THE INVENTION

The invention relates to a planar circuit for a millimeter-wave continuous wave (CW) transceiver especially for use in radar.

With pulsed radars, the transmitter sends out periodic pulses and during the interpulse period the transmitter is switched-off and a receiver is switched-on to receive energy reflected by objects in the path of the transmitted beam. In the case of continuous wave radar there is simultaneous transmission and reception of energy by way of one and the same antenna. In order to separate the signals a magnetic circulator is provided having an input port connected to an RF source, a output/input port coupled to an antenna and an output port for the received signal. The received signal is applied to a mixer in which it is mixed with a local oscillator signal derived by coupling-out a portion of the signal from the RF source. A disadvantage of this known arrangement is that the circuit, particularly the magnetic circulator, cannot be fabricated in monolithic technology.

SUMMARY OF THE INVENTION

An object of the present invention is to be able to make a monolithic CW transceiver.

According to the present invention there is provided an integrated millimeter wave transceiver comprising an annular slot antenna, means for feeding r.f. power to one point on the antenna, means for coupling-out received r.f. radiation from a second point on the antenna, said second point being orthogonal to said one point in the plane of the antenna, and a balanced mixer coupled to said second point.

Such a circuit is suitable for either hybrid or GaAs monolithic microwave integrated circuit (MMIC) implementation and contains components to allow the simultaneous transmission and reception of signals. This is achieved by feeding the antenna in a cross-polarised manner and using the cross polarisation as a means to separate the transmitted and received signals.

If desired the balanced mixer may be coupled to the second point by a coplanar waveguide, such as an odd mode coplanar waveguide.

Coplanar waveguides are an important structure for millimeter-wave MMIC work. Its truly planar construction results in simpler GaAs slice processing with good circuit yields since a ground plane is not required on the substrate's second surface and the substrate itself can be made thick. These features also benefit the RF performance. Many of the problems that are associated with microstrip such as high circuit losses and surface wave effects are less serious. Furthermore, coplanar waveguides are able to support two modes of propagation (one of which has a zero cut-off frequency) and this gives considerable circuit design scope.

A short circuit may be provided in the coplanar waveguide coupling the antenna to the balanced mixer at a point a quarter of a wavelength from the mixer. The short circuit prevents an even mode excited by a local oscillator from propagating to the antenna.

The balanced mixer may comprise a pair of coplanar Schottky barrier diodes which can be integrated.

The IF signal from the balanced mixer may be derived using an R.F. stop band filter.

BRIEF DESCRIPTION OF THE DRAWING

The present invention will now be described, by way of example, with reference to the accompanying drawing figures, in which.

DESCRIPTION OF THE PREFERRED EMBODIMENT

Figure 1:
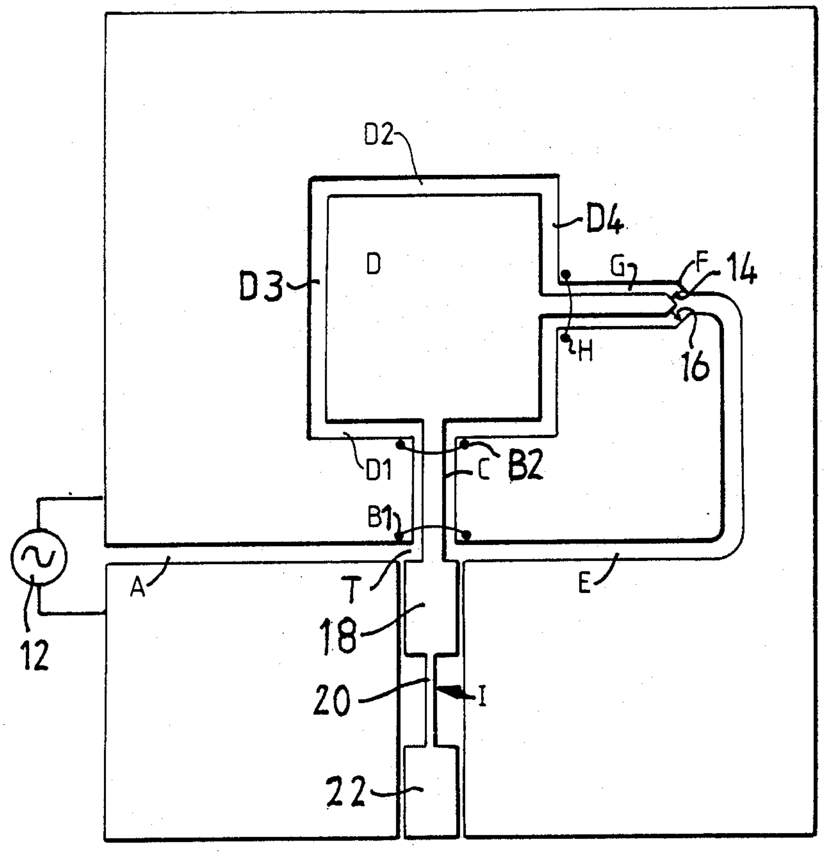
FIG. 1 is a plan view of a planar circuit which comprises a transceiver made in accordance with the invention.
Figure 2:
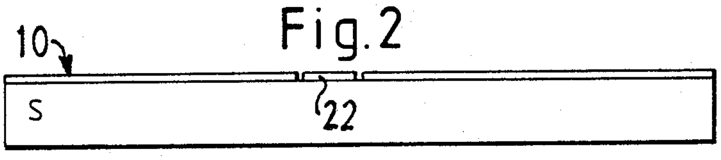
FIG. 2 is an end view of the substrate as viewed from the lower part of FIG. 1.

The transceiver shown in the drawings comprises an insulating substrate S having a conductive layer 10 forming a ground plane provided on one surface thereof. In the conductive layer an annular slot antenna is formed as a square coplanar path antenna D. The patch antenna D comprises opposite pairs of slots D1, D2 and D3, D4, which form a structure having more equal E and H plane polar diagrams than a single slot. R.F. power is coupled to a mid-point of the slot D1 and is radiated normal to the coplanar path, that is the substrate, by the slots D1, D2 with a polarisation which is in line with the feed (vertical). Horizontally polarised received signals are conveyed from a mid-point of the slot D4 to a balanced mixer F.

RF power from a source 12 is conveyed along a slot A to a power splitter formed by a transition T. The transmitter power is coupled to the odd (symmetric) mode of coplanar waveguide C which feeds the slots D1, D2 of the path antenna D. The remainder of the R.F. power constituting a local oscillator signal is conveyed in slot line E to a balanced mixer F. The balanced mixer F comprises a pair of mixer diodes 14, 16, for example coplanar Schottky barrier diodes.

The local oscillator signal excites an even (assymetric) mode on the coplanar waveguide G. This is prevented from propagating to the antenna D by a short circuit at H which is spaced a quarter of a wavelength from the balanced mixer F. The short circuit at H and those at B1 and B2 ensure that only the odd mode is allowed to propagate along their respective coplanar waveguides and that ground plane continuity is preserved around the edge of the path. Since the odd mode cannot be supported on slot line E, the signal goes into the diodes 14, 16. The IF signal goes out through the centre conductor of the coplanar line G. The IF will be in the range from a few kilohertz up to a few megahertz. The mixer is sensitive to signals that are received in a horizontal sense, i.e. in line with the coplanar line G feed to the mixer (F) and cross-polarised to the transmitter. This provides isolation between transmitted and received signals.

The IF frequency is extracted from the coplanar waveguide C by an RF stop-band filter I which in the illustrated embodiment comprises three sections 18, 20, 22 each having a length of a quarter of a wavelength of the RF frequency. Sections 18 and 22 constitute low impedance and the intermediate section constitutes a high impedance.

The advantage of this circuit is that it is suitable for monolithic integration onto a single GaAs chip whose substrate is shown at S or as a hybrid circuit. It contains nearly all the RF components for a CW radar transceiver to give a good performance at millimeter wave frequencies, for example 94 GHz. The chip could be positioned at the feed of a parabolic dish or focus of a lens to make a compact system. A circular polariser could be positioned between the circuit's antenna and the disk or in conjunction with the lens so as to allow cross circular transmit and receive polarisation.

From reading the present disclosure, other modifications will be apparent to persons skilled in the art. Such modifications may involve other features which are already known in the design, manufacture and use of circuits and component parts thereof and which may be used instead of or in addition to features already described herein.

I claim:

1. A microwave CW transceiver comprising a monolithic integrated circuit including:

a. an annular slot antenna having first and second feed points, said first feed point being coupled to a portion of the antenna which is adapted to radiate energy in a first polarization, and said second feed point being coupled to a portion of the antenna which is adapted to receive energy of a second polarization orthogonal to the first polarization;

b. an RF source coupled to the first feed point for applying to the antenna RF energy to be transmitted in the first polarization; and c. a balanced mixer coupled to the second feed point and to the RF source for mixing at least a portion of the received energy of the second polarization with coupled energy from the RF source.

2. A transceiver as claimed in claim 1, wherein a coplanar waveguide couples the balanced mixer to said second point.

3. A transceiver as claimed in claim 2, wherein the coplanar waveguide is an odd mode coplanar line.

4. A transceiver as claimed in claim 2 or 3, in which a short circuit is provided in the coplanar waveguide coupling the antenna to the balanced mixer at a point a quarter of a wavelength from the mixer.

5. A transceiver as claimed in claim 1, 2 or 3, in which the balanced mixer comprises a pair of coplanar Schottky barrier diodes.

6. A transceiver as claimed in claim 1, 2 or 3, in which an R.F. stop band filter is coupled to the balanced mixer for deriving an IF signal.

7. A transceiver as claimed in claim 1, 2 or 3, in which at least the antenna and balanced mixer are provided on a GaAs substrate.

* * * * *